United States Patent
Cook et al.

(10) Patent No.: US 11,873,097 B2
(45) Date of Patent: *Jan. 16, 2024

(54) AIRCRAFT INTERIOR LAVATORY

(71) Applicant: B/E Aerospace, Inc., Winston-Salem, NC (US)

(72) Inventors: Donald F. Cook, Arlington, WA (US); Liberty Harrington, Seattle, WA (US); Philipp Steiner, Seattle, WA (US); Robert K. Brauer, Seattle, WA (US); Trevor Skelly, Mercer Island, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,163

(22) Filed: Jun. 29, 2021

(65) Prior Publication Data
US 2022/0119116 A1 Apr. 21, 2022

Related U.S. Application Data

(63) Continuation of application No. 16/819,878, filed on Mar. 16, 2020, now Pat. No. 11,077,946, which is a
(Continued)

(51) Int. Cl.
*B64D 11/02* (2006.01)
*B64C 1/10* (2006.01)
(Continued)

(52) U.S. Cl.
CPC ............ *B64D 11/02* (2013.01); *B64C 1/10* (2013.01); *B64D 11/06* (2013.01); *B64D 11/064* (2014.12); *B64F 5/00* (2013.01); *Y02T 50/40* (2013.01)

(58) Field of Classification Search
CPC .......... B64D 11/00; B64D 2011/0046; B64D 11/0023; B64D 11/06; B64D 2011/0617;
(Continued)

(56) References Cited

U.S. PATENT DOCUMENTS 2,650,368 A 9/1953 Evans
2,760,443 A 8/1956 Gobrecht
(Continued)

FOREIGN PATENT DOCUMENTS

CN 1867485 A 11/2006
CN 1950256 A 4/2007
(Continued)

OTHER PUBLICATIONS

B/E Aerospace Investor Day Presentation dated Mar. 12, 2012. 56 pages.
(Continued)

*Primary Examiner* — Benjamin P Lee
(74) *Attorney, Agent, or Firm* — FOLEY & LARDNER LLP (57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

26 Claims, 1 Drawing Sheet

Related U.S. Application Data continuation of application No. 16/283,471, filed on Feb. 22, 2019, now Pat. No. 10,625,862, which is a continuation of application No. 15/258,529, filed on Sep. 7, 2016, now Pat. No. 10,259,558, which is a continuation of application No. 15/141,494, filed on Apr. 28, 2016, now Pat. No. 9,463,878, which is a continuation of application No. 14/709,378, filed on May 11, 2015, now Pat. No. 9,365,292, which is a continuation of application No. 14/043,500, filed on Oct. 1, 2013, now Pat. No. 9,073,641, which is a continuation of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
  *B64D 11/06* (2006.01)
  *B64F 5/00* (2017.01)

(58) Field of Classification Search
  CPC . B64D 2011/0665; B63B 11/00; B63B 11/02; B63B 29/00; B63B 29/02
  See application file for complete search history.

(56) References Cited

U.S. PATENT DOCUMENTS

| | | |
|---|---|---|
| 2,914,001 A | 11/1959 | Murphy |
| 3,738,497 A | 6/1973 | Betts et al. |
| 4,055,317 A | 10/1977 | Greiss |
| 4,884,767 A | 12/1989 | Shibata |
| 5,150,863 A | 9/1992 | Hozumi |
| 5,333,416 A | 8/1994 | Harris et al. |
| 5,340,059 A | 8/1994 | Kanigowski |
| 5,482,230 A | 1/1996 | Bird et al. |
| 5,529,265 A | 6/1996 | Sakurai |
| 5,577,358 A | 11/1996 | Franke |
| 5,611,503 A | 3/1997 | Brauer |
| 5,716,026 A | 2/1998 | Pascasio et al. |
| 6,000,659 A | 12/1999 | Brauer |
| 6,007,025 A | 12/1999 | Coughren et al. |
| 6,079,669 A | 6/2000 | Hanay et al. |
| 6,237,872 B1 | 5/2001 | Bar-Levav |
| 6,520,451 B1 | 2/2003 | Moore |
| 6,615,421 B2 | 9/2003 | Itakura |
| 6,742,840 B2 | 6/2004 | Bentley |
| 6,822,812 B1 | 11/2004 | Brauer |
| 6,874,731 B1 | 4/2005 | Brauer et al. |
| 6,889,936 B1 | 5/2005 | Pho et al. |
| D508,173 S | 8/2005 | Guard et al. |
| D516,496 S | 3/2006 | Guard et al. |
| D533,129 S | 12/2006 | Guard et al. |
| 7,156,345 B2 | 1/2007 | Brauer et al. |
| 7,222,820 B2 | 5/2007 | Wentland et al. |
| 7,252,267 B2 | 8/2007 | Young et al. |
| 7,284,287 B2 | 10/2007 | Cooper et al. |
| 7,318,622 B2 | 1/2008 | Rezag et al. |
| 7,331,545 B2 | 2/2008 | Young et al. |
| 7,448,574 B2 | 11/2008 | Young et al. |
| 7,448,575 B2 | 11/2008 | Cheung et al. |
| 7,469,860 B2 | 12/2008 | Young et al. |
| 7,516,919 B2 | 4/2009 | Young et al. |
| D606,923 S | 12/2009 | Young et al. |
| D617,254 S | 6/2010 | Guard et al. |
| 7,871,039 B2 | 1/2011 | Fullerton et al. |
| 7,934,679 B2 | 5/2011 | Bock et al. |
| 8,087,613 B2 | 1/2012 | Fullerton et al. |
| 8,096,502 B2 | 1/2012 | Bock et al. |
| 8,109,469 B2 | 2/2012 | Breuer et al. |
| 8,162,258 B2 | 4/2012 | Joannis et al. |
| 8,167,244 B2 | 5/2012 | Johnson et al. |
| 8,177,163 B2 | 5/2012 | Wilcynski et al. |
| 8,590,838 B2 | 11/2013 | Cook et al. |
| D705,909 S | 5/2014 | Koyama et al. |
| 8,991,947 B2 | 3/2015 | Lee |
| 9,073,641 B2 | 7/2015 | Cook et al. |
| 9,321,534 B2 | 4/2016 | Grieve et al. |
| 9,327,836 B2 | 5/2016 | Weitzel et al. |
| 9,359,077 B2 | 6/2016 | Koyama |
| 9,365,292 B2 | 6/2016 | Cook et al. |
| 9,382,006 B2 | 7/2016 | Koyama |
| 9,428,274 B2 | 8/2016 | Moje et al. |
| 9,434,476 B2 | 9/2016 | Cook et al. |
| 9,440,742 B2 | 9/2016 | Cook et al. |
| 9,457,903 B2 | 10/2016 | Moje et al. |
| 9,862,490 B2 | 1/2018 | Schliwa et al. |
| 9,862,491 B2 | 1/2018 | McKee et al. |
| 9,908,623 B2 | 3/2018 | Hashberger et al. |
| 10,023,314 B2 | 7/2018 | Savian |
| 10,625,862 B2 | 4/2020 | Cook et al. |
| 2003/0193220 A1 | 10/2003 | Jensen |
| 2004/0227034 A1 | 11/2004 | Wentland et al. |
| 2005/0001097 A1 | 1/2005 | Saint-Jalmes |
| 2005/0082430 A1 | 4/2005 | Young et al. |
| 2006/0065783 A1 | 3/2006 | Mills |
| 2006/0192050 A1 | 8/2006 | Cheung et al. |
| 2007/0164157 A1 | 7/2007 | Park |
| 2007/0170310 A1 | 7/2007 | Bock et al. |
| 2007/0228216 A1 | 10/2007 | Wenstrom |
| 2007/0241232 A1 | 10/2007 | Thompson |
| 2007/0295863 A1 | 12/2007 | Thompson |
| 2009/0050738 A1 | 2/2009 | Breuer et al. |
| 2009/0050783 A1 | 2/2009 | Roberts |
| 2009/0065642 A1 | 3/2009 | Cheung et al. |
| 2009/0146004 A1 | 6/2009 | Plant |
| 2009/0200422 A1 | 8/2009 | Johnson et al. |
| 2009/0255437 A1 | 10/2009 | Hachet et al. |
| 2010/0059625 A1 | 3/2010 | Saint-Jalmes et al. |
| 2010/0181425 A1 | 7/2010 | Guering et al. |
| 2011/0121134 A1 | 5/2011 | Schotte et al. |
| 2011/0139930 A1 | 6/2011 | Sutthoff et al. |
| 2011/0210205 A1 | 9/2011 | Bock et al. |
| 2011/0253835 A1 | 10/2011 | Cook et al. |
| 2012/0025018 A1 | 2/2012 | France et al. |
| 2012/0112505 A1 | 5/2012 | Breuer et al. |
| 2012/0253752 A1 | 10/2012 | Brauer |
| 2012/0273614 A1 | 11/2012 | Ehlers et al. |
| 2012/0325964 A1 | 12/2012 | Hawkins et al. |
| 2013/0206906 A1 | 8/2013 | Burrows et al. |
| 2013/0320139 A1 | 12/2013 | Cho |
| 2014/0014774 A1 | 1/2014 | Pozzi et al. |
| 2014/0027572 A1 | 1/2014 | Ehlers et al. |
| 2014/0027574 A1 | 1/2014 | Obadia et al. |
| 2014/0196206 A1 | 7/2014 | Savian et al. |
| 2015/0239563 A1 | 8/2015 | Cook et al. |
| 2015/0251760 A1 | 9/2015 | Hawkins et al. |
| 2015/0363656 A1 | 12/2015 | Brauer |

FOREIGN PATENT DOCUMENTS

| | | |
|---|---|---|
| CN | 101218149 A | 7/2008 |
| CN | 101351384 A | 1/2009 |
| CN | 101588966 A | 11/2009 |
| CN | 101765541 A | 6/2010 |
| DE | 69422723 T2 | 6/2000 |
| DE | 69725542 T2 | 4/2004 |
| DE | 102007009863 A1 | 9/2008 |
| EP | 0 722 404 A1 | 4/1995 |
| EP | 0 850 833 A2 | 7/1998 |
| EP | 0 850 834 A1 | 7/1998 |
| EP | 1 281 614 A1 | 2/2003 |
| EP | 1 685 023 A2 | 8/2006 |
| EP | 2 814 736 A1 | 12/2014 |
| JP | H05-246355 A | 9/1993 |
| JP | 2007-523002 A | 8/2007 |
| JP | 2009-513419 A | 4/2009 |
| WO | WO-03/026495 A2 | 4/2003 |
| WO | WO-2005/014395 A1 | 2/2005 |
| WO | WO-2005/080196 A1 | 9/2005 |

(56) References Cited

FOREIGN PATENT DOCUMENTS

| | | |
|---|---|---|
| WO | WO-2007/006938 A1 | 1/2007 |
| WO | WO-2007/013164 A1 | 2/2007 |
| WO | WO-2009/073244 A1 | 6/2009 |
| WO | WO-2014/024046 A2 | 2/2014 |

OTHER PUBLICATIONS

B/E Aerospace News Release—"Boeing Delivers First of 100 Next-Generation 737s to Delta Air Lines Configured with Numerous B/E Aerospace Systems and Products.".
B/E Aerospace Press Release regarding Investor Day Webcast dated Mar. 12, 2012.
B/E Aerospace, Inc.'s Opening Brief in case No. IPR2017-01275 and No. IPR2017-01276 dated Sep. 6, 2019. 218 pages.
B/E Aerospace, Inc's Reply Brief in case No. IPR2017-01275 & IPR2017-01276 dated Nov. 6, 2019. 22 pages.
B/E Aerospace, Inc.'s Motion for Preliminary Injunction, May 16, 2014, 25 pages.
B/E Aerospace, Inc.'s Response in case IPR2017-01275 dated Jan. 31, 2018. 52 pages.
B/E Aerospace, Inc.'s Response in case IPR2017-01276 dated Jan. 31, 2018. 61 pages.
B/E Aerospace, Inc.'s Response in case PGR2017-00019 dated Jan. 31, 2018. 48 pages.
B/E Aerospace's Complaint for Patent Infringement in *B/E Aerospace, Inc.* v. *Zodiac Aerospace, Inc. et al.*, No. 2:14-v-01417 {E.D. Tex., Dec. 15, 2016).
C&D Zodiac, Inc's Notice of Appeal in case IPR2017-01273 dated Mar. 19, 2018. 24 pages.
C&D Zodiac, Inc's Notice of Appeal in case IPR2017-01274 dated Mar. 19, 2018. 28 pages.
C&D Zodiac, Inc's Reply Brief in case No. IPR2017-01275 & IPR2017-01276 dated Oct. 16, 2019. 44 pages.
C&D Zodiac, Inc's Reply in case IPR2017-01275 dated May 1, 2018. 35 pages.
C&D Zodiac, Inc.'s drawings with a leading page entitled "MD90," 27 pages.
C&D Zodiac, Inc.'s Petition for Inter Partes Review of U.S. Pat. No. 8,590,838 (including Exhibits tabs 1-9), May 2, 2014, 856 pages.
C&D Zodiac, Inc.'s proposal to Scandinavian Airlines System to manufacture S4 Storage Unit, Aug. 23, 2001, 17 pages.
C&D Zodiac, Inc.'s Reply in case IPR2017-01276 dated May 1, 2018. 35 pages.
C&D Zodiac, Inc.'s Reply in case PGR2017-00019 dated May 1, 2018. 32 pages.
CA Office Action for Canadian Application No. CA 2879022 dated Aug. 11, 2020, 4 pages.
Canadian Office Action for Application No. CA 2796589 dated Apr. 16, 2020, 3 pages.
Chinese Search Report, dated Aug. 5, 2014, 1 pages, from Chinese application No. 2011800202050.
Decision Denying Institution of Inter Partes Review in case IPR2017-01273 dated Oct. 31, 2017. 11 pages.
Decision Denying Institution of Inter Partes Review in case IPR2017-01274 dated Oct. 31, 2017. 14 pages.
Decision in Institution of Inter Partes Review in case IPR2017-01276 dated Oct. 31, 2017. 28 pages.
Decision in Institution of Post-Grant Review in case PGR2017-00019 dated Oct. 31, 2017. 27 pages.
Decision Instituting Inter Partes Review in case IPR2017-01275 dated Oct. 31, 2017. 24 pages.
Decision pursuant to 37 C.F.R. 42.71(d) in case IPR2017-01273 dated Mar. 8, 2018. 6 pages.
Decision pursuant to 37 C.F.R. 42.71 (d) in case IPR2017-01274 dated Mar. 9, 2018. 7 pages.
Decision: United States Court of Appeals for the Federal Circuit (2019-1935 and 2019-1936), dated Jun. 26, 2020, 14 pages.
Declaration of Alan Anderson Under 37 C.F.R. § 1.68.
Declaration of Mitchell Freeman, submitted during prosecution of U.S. Appl. No. 14/709,378.
Declaration of Paul Sobotta executed Apr. 2, 2015 and submitted in IPR2014-00727.
Declaration of R. Klaus Brauer, submitted during prosecution of U.S. Appl. No. 14/709,378.
Declaration of Ronald Kemnitzer executed Apr. 10, 2017 and submitted in PGR2017-00019.
Declaration of Scott Savian, dated Mar. 20, 2017, including Exhibits A-E thereto.
Declaration of Vince Huard, dated Mar. 10, 2017, including Exhibits A-I thereto.
EP Examination Report for European Application No. EP 18202015.6 dated May 29, 2020, 5 pages.
EPO, International Search Report and Written Opinion for PCT international Application No. PCT/US2011/033090 dated Sep. 15, 2011.
Examination Report on Australian Application No. 2017221822 dated Nov. 12, 2018. 2 pages.
Final Written Decision in case IPR2017-01276 dated Sep. 28, 2018. 51 pages.
Final Written Decision in IPR 2017-01276 under 35 U.S.C. 318; 37 U.S.C. 42 entered Sep. 28, 2018. 51 pages.
Final Written Decision in IPR2014-00727 under 35 U.S.C. § 318; 37 C.F.R. § 42.73.
Final Written Decision, Case IPR2014-00727, Paper No. 65 (PTAB Oct. 26, 2015).
Final Written Decision, Case IPR2017-01275, dated Oct. 23, 2018. 49 pages.
First Office Action on Chinese Patent Application No. 201180020205.0 dated Aug. 5, 2014. 17 pages.
First Office Action on Chinese Patent Application No. 201380037324.6 dated Nov. 16, 2015. 15 pages.
Flight Structures, Inc. 747 Door 4 Overhead Crew Rest rendering. 1 page.
Flight Structures, Inc., 747 Door 4 Overhead Crew Rest rendering.
Greg Chamitoff Declaration in support of B/E Aerospace, Inc.'s Motion for Preliminary Injunction, May 14, 2014, 39 pages.
Image of B/E Aerospace "Spacewall," available at <http://beaerospace.com/products/structures-and-integration/737- advanced-lavatory/>.
International Search Report, dated Jan. 27, 2015, 5 pages, from PCT/US2013/050342 published as WO 2014/014780 dated Jan. 23, 2014.
Judgment Inter Partes Review in cases IPR2017-01275 and IPR2017-01276 dated Jul. 5, 2018. 4 pages.
Letter from Flight Structures, Inc. to Air France, Aug. 3, 1994, re "B747-400M Door 4 Crew Rest", and enclosures.
Letters from Petitioner, C&D Zodiac, Inc. to Patent Owner, B/E Aerospace, Inc. regarding Prior Art. 64 pages.
McDonnel Douglas, DC-10 Customer Configuration, Oct. 1978, 177 pages.
McDonnell Douglas DC-10 Customer Configuration Summary (a/k/a Orange Book), revised Oct. 1978 (the "Orange Book").
New aircraft lav sees B/E Aerospace flushed with success, Apex Editor's Blog Article dated Apr. 19, 2013.
Notice of Supplemental Authority in *B/E Aerospace, Inc.* v. *C&D Zodiac, Inc.*, Nos. 2019-1935, 2019-1936, dated Feb. 10, 2020, 3 pages.
Office Action on Australian Patent Application No. 2011242901 dated Aug. 25, 2015. 3 pages.
Office Action on Australian Patent Application No. 2016219635 dated Aug. 31, 2016. 3 pages.
Office Action on Canadian Patent Application No. 2796589 dated Jan. 11, 2017. 4 pages.
Office Action on Canadian Patent Application No. 2879022 dated Apr. 16, 2018. 3 pages.
Office Action on Canadian Patent Application No. 2879022 dated Jul. 12, 2017. 3 pages.
Office Action on EP Application No. 18202015.6 dated Jul. 8, 2019. 6 pages.
Office Action on European Patent Application No. 11717127 dated Mar. 16, 2017. 5 pages.

(56) References Cited

OTHER PUBLICATIONS

Office Action on European Patent Application No. 13819463 dated Dec. 12, 2017. 4 pages.
Office Action on Japanese Patent Application No. 2013-506240 dated Feb. 24, 2015. 4 pages.
Office Action on Japanese Patent Application No. 2013-506240 dated Jun. 24, 2014. 4 pages.
Office Action on Japanese Patent Application No. 2013-506240 dated Oct. 1, 2013. 4 pages.
Office Action on Japanese Patent Application No. 2015-523145 dated Jun. 5, 2017. 6 pages.
Office Action on Japanese Patent Application No. 2015-523145 dated Mar. 1, 2016. 6 pages.
Office Action on Japanese Patent Application No. 2015-523145 dated Nov. 29, 2017. 4 pages.
Office Action on Japanese Patent Application No. 2015-523145 dated Oct. 18, 2016. 6 pages.
Order on petition for rehearing En Banc in case IPR2014-00727 dated Dec. 7, 2017. 2 pages.
Patent Owner's Opening Brief in Federal Circuit Appeal Nos. 16-1496, 16-1497.
Patent Reexamination Board Decision on CN Application No. 201380037324.6 dated May 30, 2019. 17 pages.
Petition for Inter Partes Review of U.S. Pat. No. 9,073,641 filed Apr. 13, 2017 and assigned IPR No. PR2017-01275.
Petition for Inter Partes Review of U.S. Pat. No. 9,365,292 filed Apr. 13, 2017 and assigned IPR No. PR2017-01274.
Petition for Inter Partes Review of U.S. Pat. No. 9,440,742 filed Apr. 13, 2017 and assigned IPR No. PR2017-01276.
Petition for Post Grant Review of U.S. Design Patent No. D764,031 filed Apr. 10, 2017 and assigned PGR No. PGR2017-00019.
Petition for rehearing En Banc in case IPR2014-00727 dated Nov. 11, 2017. 46 pages.
Photographs of C&D Zodiac, Inc.'s S4 storage unit, 5 pages.
R. Klaus Brauer, Affidavit Submitted in Related Case U.S. Appl. No. 14/709,378, signed Mar. 31, 2016, pp. 1-19.
R. Klaus Brauer, Affidavit Submitted in Related Case U.S. Appl. No. 14/709,409, signed Mar. 28, 2016, pp. 1-19.
Rendering and photographs of Boeing 747 overhead crew rest station, 3 pages.
Request for Reconsideration of Decision Denying Institution of Inter Partes Review in case IPR2017-01273 dated Nov. 29, 2017. 15 pages.
Request for reconsideration of decision denying institution of inter partes review in case IPR2017-01274 dated Nov. 29, 2017. 15 pages.
Request for rehearing following final written decision in case IPR2017-01276 dated Oct. 12, 2018. 18 pages.
Screen capture from website of Tony Bravetti, available at <http://www.tonybravetti.com/my-work-edited>.
Search on Chinese Patent Application No. 201180020205.0 dated Jul. 28, 2014. 1 page.
Search on Chinese Patent Application No. 201380037324.6 dated Nov. 3, 2015. 2 pages.
Search Report on EP Application No. 18202015.6 dated Jun. 18, 2019. 4 pages.
SEC Exhibit 99.1—B/E Aerospace News Release—"B/E Aerospace Wins Exclusive Boeing Award; Program Estimated Value in Excess of $800 Million.".
Second Board Opinion on Chinese Application No. 201380037324.6 dated Jan. 24, 2019. 9 pages.
Second Office Action on Chinese Patent Application No. 201380037324.6 dated Jul. 13, 2016. 16 pages.
Slide Deck, B/E Aerospace, Spacewall Technology, Examiner Interview, Feb. 24, 2016, 53 pages.
Startup Boeing, DC-10 presentation, copyright 2007. 27 pages.
Technical Proposal by FSI to Air France regarding a Door 4 overhead crew rest station for the Boeing 747, Aug. 3, 1994, 10 pages.
Unopposed Motion to Withdraw Motion for Preliminary Injunction in B/E Aerospace, Inc. v. Zodiac Aerospace, et al., No. 2:14-cv-210, Okt. 47 (E.D. Tex. Jun. 6, 2014).
Voluntary Dismissal in B/E Aerospace, Inc. v. Zodiac Aerospace, et al., No. 2:14-cv-210, 0kt. 50 (E.D. Tex. Jun. 19, 014).
Request for Ex Parte Reexamination, U.S. Appl. No. 90/014,980, filed Mar. 15, 2022.
Request for Ex Parte Reexamination, U.S. Appl. No. 90/014,978, filed Mar. 15, 2022.
Request for Ex Parte Reexamination, U.S. Appl. No. 90/014,979, filed Mar. 15, 2022.
Request for Ex Parte Reexamination, U.S. Appl. No. 90/014,981, filed Mar. 15, 2022.
Request for Ex Parte Reexamination, U.S. Appl. No. 90/014,982, filed Mar. 15, 2022.
"The History of Aircraft Safety," Zodiac Airline Symposium 2015, pp. 1-2.
Adam Dershowitz curriculum vitae, pp. 1-3.
Affidavit of Christopher Butler, Office Manager at the Internet Archive, attaching copies of archived websites and DC-10 specifications from the Boeing.com website, dated between 1998 and 2011, pp. 1-658.
Amended Petition for Inter Partes Review under 35 U.S.C. §§ 311-319 and 37 C.F.R. § 42.100 ET SEQ, filed May 14, 2014 in IPR2014-00727, pp. 1-65.
Anderson's annotations to Betts, U.S. Pat. No. 3,738,497 (Exhibit to Alan Anderson's Deposition (Dec. 18, 2014), pp. 1-6.
Article: "Humans Prefer Curved Visual Objects," Aug. 1, 2006, pp. 1-4.
Article: "Principles of Design: Contour Bias," Dec. 8, 2015, pp. 1-3.
Atlanta Business Chronicle, "Southwest Airlines raises curtain on new seating and it's about time," Apr. 15, 2015, pp. 1-2. http://www.bizjournals.com/atlanta/news/2015/04/15/southwestairlines-raises-curtain-on-new-seating.html.
Attorney Biography of Steven D. Moore, 2010-2013, pp. 1-4.
B/E Aerospace Advanced Modular Lavatory Image, (Exhibit to Alan Anderson Deposition Dec. 18, 2014), 1 page.
Bill Najd, @BillNajd Tweet (Nov. 17, 2011), pp. 1-5.
Bill Najd's (Chief Engineer, Technical Operations, Zodiac Aerospace) Linkedin Profile, pp. 1-4—https://www.linkedin.com/in/bill-ajd-88030213/.
Complaint for Patent Infringement and Demand for Jury Trial filed Mar. 11, 2014 in the case of B/E Aerospace, Inc. v. Zodiac Aerospace, Inc., et al., No. 2:14-cv-210 (E.D. Tex.) pp. 1-19.
Configuration schematic depicting the configuration of Zodiac's curved wall lavatory as installed on a Boeing aircraft, pp. 1-6.
Continuation Patent Application as filed in U.S. Appl. No. 14/043,500 (resulting in U.S. Pat. No. 9,073,641), pp. 1-11.
Crystal Cabin Award Association, "The 7 best products for aircraft cabins in 2014," Apr. 8, 2014, Hamburg, Germany, pp. 1-3.
Crystal-Cabin Award: Competition, 1 page. http://www.crystal-cabin-award.com/index.php?id=163.
Current Schedule in BE Aerospace, Inc. v. Safran Cabin, Inc. et al., No. 2:19-cv-01480-MWF-AFM, filed Mar. 25, 2022 in IPR2022-00749, pp. 1-19.
Curriculum Vitae of Steven J. Meyers, Ph.D. filed Mar. 25, 2022 in IPR2022-00749, pp. 1-14.
Decision—Institution of Inter Partes Review 37 CFR § 42.108, IPR2014-00727 entered Oct. 29, 2014, Paper No. 15, pp. 1-27.
Decision Denying Institution Inter Partes Review 35 U.S.C. § 314, 37 C.F.R. §§ 42.4, 42.108, IPR2017-01274, Paper 12, Oct. 31, 2017, pp. 1-14.
Decision Denying Institution Inter Partes Review 35 U.S.C. § 314, 37 C.F.R. §§ 42.4, 42.108, IPR2017-01275, Paper 12, Oct. 31, 2017, pp. 1-24.
Decision Denying Institution Inter Partes Review 35 U.S.C. § 314, 37 C.F.R. §§ 42.4, 42.108, Paper 12, entered Oct. 31, 2017 in IPR2017-01273, pp. 1-11.
Decision Denying Patent Owner's Request for Rehearing under 37 CFR § 42.71, entered Mar. 29, 2019 in IPR2017-01275, pp. 1-9.
Decision Denying Patent Owner's Request for Rehearing under 37 CFR § 42.71, entered Mar. 29, 2019 in IPR2017-01276, pp. 1-9.

(56) References Cited

OTHER PUBLICATIONS

Decision Denying Petitioner's Request for Rehearing 37 C.F.R § 42.71(d), Paper No. 15, entered Mar. 9, 2018 in IPR2017-01274, pp. 1-7.
Decision Denying Petitioner's Request for Rehearing 37 C.F.R. § 42.71 (d), Paper 15, entered Mar. 8, 2018 in IPR2017-01273, pp. 1-6.
Decision Granting Institution of Inter Partes Review (35 U.S.C. Section 314) dated Oct. 21, 2022, pp. 1-27.
Decision Granting Patent Owner B/E Aerospace, Inc.'s Motion to Seal and for Protective Order under 37 C.F.R. §§ 42.14, 42.54, Paper No. 62, entered Jun. 22, 2015, pp. 1-3.
Decision Granting-in-Part Motion for Discovery under 37 C.F.R. § 42.51, Paper No. 37, entered Apr. 14, 2015 in IPR2014-00727, pp. 1-4.
Decision regarding Petitioner C&D Zodiac, Inc.'s Motion to Expunge under 37 C.F.R. § 42.56, Paper No. 71, entered Jan. 5, 2016, pp. 1-3.
Declaration of Adam Dershowitz in Support of B/E's Patent Owner Responses, Jan. 31, 2018, pp. 1-99.
Declaration of Adam Dershowitz, signed Feb. 3, 2015 in IPR2014-00727, pp. 1-92.
Declaration of Alan Anderson Under 37 C.F.R. Section 1.68 filed Apr. 13, 2017 in IPR2017-01276, pp. 1-133.
Declaration of Alan Anderson, signed May 2, 2014 in IPR2014-00727, pp. 1-45.
Declaration of David A. Reed, signed May 1, 2015 in IPR2014-00727, pp. 1-5.
Declaration of Ellisen S. Turner signed Feb. 3, 2015 (regarding Orange Binder photos) in IPR2014-00727, pp. 1-4.
Declaration of Gary L. Frazier, signed May 1, 2015 in IPR2014-00727, pp. 1-51.
Declaration of Jarold Newkirk, signed Apr. 30, 2014, pp. 1-193.
Declaration of John Schoenberg, signed Nov. 26, 2014 in IPR2014-00727, pp. 1-3.
Declaration of Mark E. Withrow In Support of B/E's Patent Owner Response, signed Feb. 3, 2015 in IPR2014-00727, pp. 1-17.
Declaration of Mitchell Freeman filed in Application Nos. U.S. Appl. No. 14/709,406 and U.S. Appl. No. 14/709,406, signed Mar. 28, 2016, pp. 1-4.
Declaration of Morgan Chu In Support of B/E's Unopposed Motion for Pro Hac Vice Admission in IPR2014-00727, signed Jun. 11, 2014, pp. 1-5.
Declaration of R. Klaus Brauer, filed in U.S. Appl. No. 14/709,378, signed Mar. 31, 2016, pp. 1-19.
Declaration of Scott Savian, dated Mar. 20, 2017, including Exhibits A-E, filed Apr. 13, 2017 in IPR2017-01276, pp. 1-77.
Declaration of Scott Savian, dated Mar. 20, 2017, including Exhibits A-I, filed Mar. 25, 2022 in IPR2022-00749, pp. 1-77.
Declaration of Steven J. Meyers, Ph.D. filed Mar. 25, 2022 in IPR2022-00749, pp. 1-74.
Declaration of Thomas Boozer, signed Feb. 2, 2015 in IPR2014-00727, pp. 1-37.
Declaration of Vince Huard, dated Mar. 10, 2017, including Exhibits A-I, filed Apr. 13, 2017 in IPR2017-01276, pp. 1-127.
Declaration of Vince Huard, dated Mar. 10, 2017, including Exhibits A-I, part 1 of 2, filed Mar. 25, 2022 in IPR2022-00749, pp. 1-74.
Declaration of Vince Huard, dated Mar. 10, 2017, including Exhibits A-I, part 2 of 2, filed Mar. 25, 2022 in IPR2022-00749, pp. 1-52.
Declaration of Werner Lieberherr (Redacted), filed by B/E Aerospace, Inc. v. Zodiac Aerospace, et al., 2:14-cv-00210-JRG-RSP (E.D. Tex.) at Dkt. #28.27, with Exhibits A-G, signed May 16, 2014, pp. 1-44.
Declarations of R. Klaus Bauer filed Jul. 22, 2022 in IPR2022-00749, pp. 1-19.
Defendant's First Set of Requests for Production of Documents and Things to Plaintiff B/E Aerospace, Inc. (Nos. 1-9), B/E Aerospace, Inc. v. Zodiac Aerospace, Case 2:16-cv-01417-JRG-RSP (E.D. Tex.), served May 29, 2014, pp. 1-11.
Defendant's Motion to Stay Pending Inter Partes and Post-Grant Review, B/E Aerospace, Inc. v. Zodiac Aerospace, et al., Case 2:16-cv-01417-JRG-RSP (E.D. Tex.) Doc. 163, filed May 2, 2017, pp. 1-13.
Defendant's Reply to B/E Aerospace Opposition to Motion to Stay Pending Inter Partes and Post-Grant Review, B/E Aerospace, Inc. v. Zodiac Aerospace, et al., Case 2:16-cv-01417-JRG-RSP (E.D. Tex.) Doc. 180 filed May 23, 2017, pp. 1-8.
Deposition of Alan Anderson Transcript taken on Dec. 18, 2014 in IPR2014-00727, pp. 1-132.
Deposition of Jarold Newkirk Transcript taken on Jan. 20, 2015 in IPR2014-00727, pp. 1-86.
Deposition of John Schoenberg Transcript taken on Jan. 20, 2015 in IPR2014-00727, pp. 1-72.
Deposition of Paul Sobotta Transcript (Redacted) taken on May 21, 2015 in IPR2014-00727, pp. 1-70.
Dictionary of Aviation, Second Edition, Definitions of "lavatory" and "toilet", David Crocker and Peter Collin Publishing Ltd., Reprinted 2007, pp. 1-8.
Dictionary of Aviation, Second Edition, Definitions of "aft," "enclose," and "unit", David Crocker and Peter Collin Publishing Ltd., Reprinted 2007, pp. 1-8.
Dow Jones Reprints, Business, "Rivals Battle to Design Toilets Good Enough to Fly," Mar. 28, 2013, pp. 1-4. http://online.wsj.com/news/articles/SB10001424127887323293704578330294197225064#printMode.
Email chain between Benjamin Haber and David Reed regarding Motion to Expunge Confidential Information, dated Dec. 10, 2015 in IPR2014-00727, pp. 1-3.
Email from Design Engineer, Brett Smith in Zodiac La Palma to the Program Manager, Jason Baseil, at Zodiac NAT, and associated email chain, with earliest date of Aug. 2, 2013, pp. 1-4.
Eule, Alexander; "Why B/E Aerospace is Flying High", Barron's, Apr. 5, 2014. 1 page.
Excerpt from 737 Airplane Characteristics for Airport Planning specification, Sep. 2013, pp. 1-8.
Excerpt from McDonnell Douglas Corporation, Douglas Aircraft Company DC/MD-10 specification, Apr. 2004, pp. 1-8.
Exhibit B (Claim Chart), B/E Aerospace, Inc. v. Zodiac Aerospace, et al., Case 2:16-cv-01417-JRG-RSP (E.D. Tex). Doc. 1-2 filed Dec. 15, 2016, pp. 1-31.
Exponent Professional Profile of Adam Dershowitz, Ph.D., P.E. managing engineer, pp. 1-3
FAA AC No. 25.562-1B, Dynamic Evaluation of Seat Restraint Systems and Occupant Protection on Transport Airplanes (Jan. 10, 2006) filed Mar. 25, 2022 in IPR2022-00749, pp. 1-104.
Fed. Reg. vol. 71, No. 92 27595-275958 (May 12, 2006) filed Mar. 25, 2022 in IPR2022-00749, pp. 1-4.
File History from U.S. Appl. No. 09/947,275, which issued as U.S. Pat. No. 6,520,451 to Moore, pp. 1-129.
Final Office Action, dated Dec. 23, 2015 in U.S. Appl. No. 14/709,378, pp. 1-11.
Final Written Decision 35 U.S.C. § 318(a) and 37 C.F.R. § 42.73, Paper No. 41, entered Oct. 23, 2018 in IPR2017-01275, pp. 1-49.
Final Written Decision in IPR2014-00727 (addressing U.S. Pat. No. 8,590,838 B2) filed Mar. 25, 2022 in IPR2022-00749, pp. 1-33.
Final Written Decision in IPR2014-00727 filed Apr. 13, 2017 in IPR2017-01276, pp. 1-33.
Final Written Decision in IPR2017-01275 (addressing U.S. Pat. No. 9,073,641 B2) filed Mar. 25, 2022 in IPR2022-00749, pp. 1-49.
Final Written Decision in IPR2017-01276 (addressing U.S. Pat. No. 9,440,742 B2) filed Mar. 25, 2022 in IPR2022-00749, pp. 1-51.
Final Written Decision under 35 U.S.C. § 318; 37 C.F.R. § 42.73, Paper No. 65, entered Oct. 26, 2015 in IPR2014-00727, pp. 1-33.
First Amended Complaint in BE Aerospace, Inc. v. Safran Cabin Inc., et al. No. 2:19-cv-01480-MWF-AFM (C.D. Cal. Apr. 29, 2021), filed Mar. 25, 2022 in IPR2022-00749, pp. 1-51.
Hearing transcript in matter C&D Zodiac, Inc. v. B/E Aerospace, Inc. held Jun. 30, 2015, Paper No. 63 dated Aug. 17, 2015 in IPR2014-00727, pp. 1-86.
Joint Stipulation to Modify Due Dates 5 and 6, filed Jul. 2, 2018 in IPR2017-01275, pp. 1-4.

(56) References Cited

OTHER PUBLICATIONS

Joint Stipulation to Modify Due Dates 5 and 6, filed Jul. 2, 2018 in IPR2017-01276, pp. 1-4.
Judgment—Inter Partes Review 37 C.F.R § 42.73(b), Paper 36, entered Jul. 5, 2018 in IPR2017-01275 and IPR2017-01276, pp. 1-4.
Less legroom, no life rafts How Qantas Airways is cutting back dated Nov. 3, 2014, pp. 1-6—http://www.thenational.ae/business/aviation/less-legroom-no-life-rafts-how-qantas-airways-is-cutting-back.
Letter from P. Coyne to S. Moore dated Nov. 17, 2021 re *BE Aerospace, Inc. v. Safran Cabin, Inc.*, Civil Action No. 19-cv-01480-MWF, filed Mar. 25, 2022 in IPR2022-00749, pp. 1-2.
Letter to Harry A. Mittleman from Dean W. Russell regarding *B/E Aerospace, Inc. v. Zodiac Aerospace, et al.*, No. 2:14-cv-00210 (E.D. Tex.), dated Jun. 9, 2014, pp. 1-2.
Letter's to Litigation Counsel for Patent Owner in *BE Aerospace, Inc. v. Zodiac Aerospace, Inc., et al.* No. 2:14-cv-210 (E.D. Tex. Mar. 11, 2014) (the Prior Litigation) Regarding Prior Art, filed Mar. 25, 2022 in IPR2022-00749, pp. 1-64.
Letters from Petitioner to Patent Owner Regarding Prior Art, dated Apr. 7, 2014; Apr. 25, 2014; May 15, 2015; and Jun. 9, 2014; pp. 1-64.
LinkedIn—Subsidiary employees hold themselves out as representatives of Zodiac Aerospace entity, pp. 1-36.
LinkedIn—Subsidiary employees hold themselves out as representatives of Zodiac Aerospace entity, pp. 1-45.
List of References in U.S. Appl. No. 15/141,338, pp. 1-14.
MacMillan Dictionary, Definition of "lavatory", pp. 1-2. http://www.macmillandictionary.com/dictionary/american/lavatory#lavatory.
Marketing brochure describing B/E Aerospace's Spacewall lavatory product, pp. 1-13.
Marketing brochure describing B/E's spacewall lavatory product, pp. 1-6.
McCartney, Scott, The Middle Seat Terminal Home Page, "Airlines Lavs Shrink to Fit More Seats," Mar. 29, 2013, Dow Jones & Company, pp. 1-3.
McCartney, Scott; "Airlines Lavs Shrink to Fit More Seats", The Middle Seat Terminal, Mar. 29, 2013. 3 pages.
McDonnell Douglas Corporation, Douglas Aircraft Company, DC/MD-10, Airplane Characteristics for Airport Planning specification, reprinted Jan. 1991, revised Apr. 2004, pp. 1-211. http://www.boeing.com/assets/pdf/commercial/airports/acaps/dc10.pdf.
Newkirk's annotations to Betts U.S. Pat. No. 3,738,497 (Exhibit to Newkirk Deposition (Jan. 20, 2015), pp. 1-6.
Newspaper article from De Telegraaf, Nov. 7, 1992, 1 page.
Non-Final Office Action, dated Feb. 20, 2015 in U.S. Appl. No. 14/043,500, pp. 1-12.
Notice of Accepting Corrected Petition, Paper No. 5, mailed May 20, 2014 in IPR2014-00727, pp. 1-3.
Notice of Allowability dated Apr. 26, 2016 in U.S. Appl. No. 14/709,378, pp. 1-4.
Notice of Allowance dated Jul. 5, 2016 in U.S. Appl. No. 15/141,338, pp. 1-8.
Notice of Allowance, dated Apr. 8, 2015 in U.S. Appl. No. 14/043,500, pp. 1-8.
Notice of Filing of Unredacted Patent Owner B/E Aerospace, Inc.'s Preliminary Response, filed Oct. 4, 2018 in IPR2017-01276, pp. 1-79.
Notice of Filing of Unredacted Patent Owner B/E Aerospace, Inc.'s Response, filed Oct. 4, 2018 in IPR2017-01276, pp. 1-64.
Notice of Voluntary Dismissal of Complaint Without Prejudice in *B/E Aerospace, Inc. v. Zodiac Aerospace, et al.*, Case No. 2:14-cv-210, Dkt. 50 (E.D. Tex. Jun. 19, 2014) filed Apr. 13, 2017 in IPR2017-01276, pp. 1-3.
Office Action dated Dec. 30, 2015 from File History of U.S. Pat. No. 9,434,476 filed Jul. 22, 2022 in IPR2022-00749, pp. 1-11.
Office Action dated Feb. 20, 2015 from File History of U.S. Pat. No. 9,073,641 filed Jul. 22, 2022 in IPR2022-00749, pp. 1-12.
Office Action dated Jan. 16, 2013 from File History of U.S. Pat. No. 8,590,838 filed Jul. 22, 2022 in IPR2022-00749, pp. 1-11.
Office Action dated Mar. 13, 2014 from File History of U.S. Pat. No. 9,073,641 filed Jul. 22, 2022 in IPR2022-00749, pp. 1-11.
Orange Binder Photos, pp. 1-4.
Order—Conduct of the Proceeding 37 CFR section 42.5, entered Jun. 22, 2022 in IPR2017-01276, pp. 1-3.
Order—Filing of Documents and Exhibits under 37 C.F.R. § 42.6, Paper No. 30, entered Mar. 3, 2015 in IPR2014-00727, pp. 1-4.
Order—Request for Oral Argument and Amended Scheduling Order under 37 CFR sections 42.5, 42.7, entered Jun. 26, 2018 in IPR2017-01275, IPR2017-01276 and PGR2017-00019, pp. 1-5.
Order Conduct of the Proceedings 37 C.F.R. § 42.5, Paper No. 30, entered Jun. 22, 2018, pp. 1-3.
Order Re Jury Trial, *BE Aerospace, Inc. v. C& D Zodiac Aerospace*, DI 313, Case No. 2:19-cv-01480-MWF-AFM (C.D. Cal.) filed Jul. 22, 2022 in IPR2022-00749, pp. 1-19.
Order Regarding Joint Stipulation Regarding Defendants' Motion to Stay (D.I. 367) *BE Aerospace, Inc. v. Safran Cabin, Inc.*, DI 373, Case No. 2:19-cv-01480-GW-AFM (C.D. Cal.) filed Jul. 22, 2022 in IPR2022-00749, pp. 1-3.
Original Application as filed in U.S. Appl. No. 14/709,378 (resulting in U.S. Pat. No. 9,365,292), pp. 1-14.
Original Application as filed in U.S. Appl. No. 14/709,409 (resulting in U.S. Pat. No. 9,434,476), pp. 1-9.
Oxford Dictionary, Definition of "lavatory" 1 page. http://www.oxforddictionaries.com/us/definition/american_english/lavatory.
Patent Owner B/E Aerospace, Inc.'s Corrected Response Pursuant to 37 C.F.R. § 42.120, filed Feb. 9, 2015 in IPR2014-00727, pp. 1-70.
Patent Owner B/E Aerospace, Inc.'s List of Proposed Motions, filed Nov. 19, 2014 in IPR2014-00727, pp. 1-5.
Patent Owner B/E Aerospace, Inc.'s Mandatory Notices Pursuant to 37 C.F.R. § 42.8, filed in IPR2017-01274 on May 4, 2017, pp. 1-5.
Patent Owner B/E Aerospace, Inc.'s Mandatory Notices Pursuant to 37 CFR § 42.8, filed May 4, 2017 in IPR2017-01273, pp. 1-5.
Patent Owner B/E Aerospace, Inc.'s Mandatory Notices Pursuant to 37 CFR § 42.8, filed May 4, 2017 in IPR2017-01275, pp. 1-5.
Patent Owner B/E Aerospace, Inc.'s Mandatory Notices Pursuant to 37 CFR section 42.8, filed May 4, 2017 in IPR2017-01276, pp. 1-5.
Patent Owner B/E Aerospace, Inc.'s Motion to Exclude Evidence, filed Jun. 29, 2018 in IPR2017-01275, pp. 1-12.
Patent Owner B/E Aerospace, Inc.'s Motion to Exclude Evidence, filed Jun. 29, 2018 in IPR2017-01276, pp. 1-12.
Patent Owner B/E Aerospace, Inc.'s Motion to Exclude, filed May 28, 2015 in IPR2014-00727, pp. 1-22.
Patent Owner B/E Aerospace, Inc.'s Notice of Appeal to the United States Court of Appeals for the Federal Circuit, filed Dec. 10, 2015 in IPR2014-00727, pp. 1-5.
Patent Owner B/E Aerospace, Inc.'s Notice of Transcript Filing and Updated Exhibit List, filed Dec. 10, 2014 in IPR2014-00727, pp. 1-4.
Patent Owner B/E Aerospace, Inc.'s Notice of Transcript Filing and Updated Exhibit List, filed Sep. 30, 2014 in IPR2014-00727, pp. 1-4.
Patent Owner B/E Aerospace, Inc.'s Notices Pursuant to 37 C.F.R. § 42.8, filed May 23, 2014 in IPR2014-00727, pp. 1-5.
Patent Owner B/E Aerospace, Inc.'s Objections to Exhibits 1019-1030 Pursuant to 37 C.F.R. § 42.64, filed May 8, 2015 in IPR2014-00727, pp. 1-15.
Patent Owner B/E Aerospace, Inc.'s Objections to Petitioner C&D Zodiac, Inc.'s Demonstrative Exhibit, filed Jul. 31, 2018 in IPR2017-01275, pp. 1-4.
Patent Owner B/E Aerospace, Inc.'s Objections to Petitioner C&D Zodiac, Inc.'s Demonstrative Exhibit, filed Jul. 31, 2018 in IPR2017-01276, pp. 1-4.
Patent Owner B/E Aerospace, Inc.'s Opposition to Motion for Routine Discovery, filed Apr. 10, 2015 in IPR2014-00727, pp. 1-8.
Patent Owner B/E Aerospace, Inc.'s Opposition to Petitioner C&D Zodiac, Inc.'s Motion to Expunge, filed Jan. 4, 2016 in IPR2014-00727, pp. 1-10.
Patent Owner B/E Aerospace, Inc.'s Preliminary Response filed Aug. 1, 2017 in IPR2017-01275, pp. 1-72.
Patent Owner B/E Aerospace, Inc.'s Preliminary Response filed Aug. 1, 2017 in IPR2017-01276, pp. 1-76.

(56) References Cited

OTHER PUBLICATIONS

Patent Owner B/E Aerospace, Inc.'s Preliminary Response Pursuant to 37 C.F.R. § 42.107, filed Aug. 7, 2014 in IPR2014-00727, pp. 1-70.
Patent Owner B/E Aerospace, Inc.'s Preliminary Response, filed Aug. 1, 2017 in IPR2017-01273, pp. 1-77.
Patent Owner B/E Aerospace, Inc.'s Preliminary Response, filed in IPR2017-01274 on Aug. 1, 2017, pp. 1-77.
Patent Owner B/E Aerospace, Inc.'s Preliminary Response, IPR2014-00727, Paper 12, filed Aug. 7, 2014, pp. 1-70.
Patent Owner B/E Aerospace, Inc.'s Reply In Support of its Motion to Exclude the Frazier Declaration (Exhibit 1029), filed Jun. 8, 2015 in IPR2014-00727, pp. 1-11.
Patent Owner B/E Aerospace, Inc.'s Reply in Support of Motion to Exclude Evidence, filed Jul. 20, 2018 in IPR2017-01275, pp. 1-7.
Patent Owner B/E Aerospace, Inc.'s Reply in Support of Motion to Exclude Evidence, filed Jul. 20, 2018 in IPR2017-01276, pp. 1-7.
Patent Owner B/E Aerospace, Inc.'s Request for Oral Argument, filed Jun. 20, 2018 in IPR2017-01275, pp. 1-4.
Patent Owner B/E Aerospace, Inc.'s Request for Oral Argument, filed Jun. 20, 2018 in IPR2017-01276, pp. 1-4.
Patent Owner B/E Aerospace, Inc.'s Response filed Jan. 31, 2018 in IPR2017-01275, pp. 1-52.
Patent Owner B/E Aerospace, Inc.'s Response filed Jan. 31, 2018 in IPR2017-01276, pp. 1-61.
Patent Owner B/E Aerospace, Inc.'s Response Pursuant to 37 C.F.R. § 42.120, filed Feb. 3, 2015 in IPR2014-00727, pp. 1-70.
Patent Owner B/E Aerospace, Inc.'s Second Corrected Response Pursuant to 37 C.F.R. § 42.120, filed Mar. 4, 2015 in IPR2014-00727, pp. 1-75.
Patent Owner B/E Aerospace, Inc.'s Second Corrected Response, IPR2014-00727, Paper 31, filed Mar. 4, 2015, pp. 1-75.
Patent Owner B/E Aerospace, Inc.'s Unopposed Motion to Seal Pursuant to 37 C.F.R. § 42.54, filed in IPR2017-01275 on Jan. 31, 2018, pp. 1-6.
Patent Owner B/E Aerospace, Inc.'s Updated Exhibit List, filed Feb. 21, 2018 in IPR2017-01275, pp. 1-10.
Patent Owner B/E Aerospace, Inc.'s Updated Exhibit List, filed Feb. 21, 2018 in IPR2017-01276, pp. 1-10.
Patent Owner B/E Aerospace, Inc.'s Updated Exhibit List, filed Jan. 4, 2016 in IPR2014-00727, pp. 1-7.
Patent Owner B/E Aerospace, Inc.'s Updated Exhibit List, filed May 28, 2015 in IPR2014-00727, pp. 1-7.
Patent Owner's Exhibit List filed Jul. 22, 2022 in IPR2022-00749, pp. 1-3.
Patent Owner's Mandatory Notices filed Apr. 26, 2022 in IPR2022-00749, pp. 1-6.
Patent Owner's Notice of Appeal to the United States Court of Appeals for the Federal Circuit, filed May 28, 2019 in IPR2017-01275, pp. 1-5.
Patent Owner's Notice of Appeal to the United States Court of Appeals for the Federal Circuit, filed May 28, 2019 in IPR2017-01276, pp. 1-5.
Patent Owner's Objections to Exhibits Pursuant to 37 CFR § 42.64, filed Nov. 14, 2017 in IPR2017-01275, pp. 1-8.
Patent Owner's Objections to Exhibits Pursuant to 37 CFR § 42.64, filed Nov. 14, 2017 in IPR2017-01276, pp. 1-8.
Patent Owner's Objections to Petitioner's Exhibits filed Nov. 4, 2022 in IPR2022-00749, pp. 1-5.
Patent Owner's Preliminary Response filed Jul. 22, 2022 in IPR2022-00749, pp. 1-46.
Patent Owner's Sur-Reply in Response to Petitioner's Pre-Institution Reply filed Sep. 15, 2022 in IPR2022-00749, pp. 1-8.
Patent Owner's Unopposed Motion to Seal Pursuant to 37 CFR section 42.54, filed Jan. 31, 2018 in IPR2017-01276, pp. 1-6.
Patent Owner's Opening Brief in Federal Circuit Appeal Nos. 16-1496, 16-1497 filed Apr. 13, 2017 in IPR2017-01276, pp. 1-118.
Patent Owner's Opening Brief in Federal Circuit Appeal Nos. 16-1496, 16-1497, filed Mar. 25, 2022 in IPR2022-00749, pp. 1-75.

Petition for Inter Partes Review of U.S. Pat. No. 10,625,862 filed Mar. 25, 2022 and assigned IPR No. IPR2022-00749, pp. 1-69.
Petition for Inter Partes Review of U.S. Pat. No. 8,590,838 filed May 2, 2014 and assigned IPR No. IPR2014-00727, pp. 1-65.
Petition for Inter Partes Review of U.S. Pat. No. 9,073,641 filed Apr. 13, 2017 and assigned IPR No. IPR2017-01275, pp. 1-88.
Petition for Inter Partes Review of U.S. Pat. No. 9,365,292 filed Apr. 13, 2017 and assigned IPR No. IPR2017-01274, pp. 1-92.
Petition for Inter Partes Review of U.S. Pat. No. 9,434,476 filed Apr. 13, 2017 and assigned IPR No. IPR2017-01273, pp. 1-87.
Petition's Objections to Patent Owner's Evidence, served Nov. 15, 2017 in IPR2017-01275, pp. 1-44.
Petition's Objections to Patent Owner's Evidence, served Nov. 15, 2017 in IPR2017-01276, pp. 1-44.
Petitioner C&D Zodiac, Inc.'s Exhibit List, filed Apr. 3, 2015 in IPR2014-00727, pp. 1-4.
Petitioner C&D Zodiac, Inc.'s Motion to Compel Routine Discovery, filed Apr. 3, 2015 in IPR2014-00727, pp. 1-8.
Petitioner C&D Zodiac, Inc.'s Motion to Exclude Evidence Pursuant to 37 C.F.R. § 42.64(c), filed May 28, 2015 in IPR2014-00727, pp. 1-27.
Petitioner C&D Zodiac, Inc.'s Motion to Expunge Confidential Information from the Record, filed Dec. 10, 2015 in IPR2014-00727, pp. 1-9.
Petitioner C&D Zodiac, Inc.'s Notice of Appeal, filed in IPR2017-01274 on Mar. 19, 2018, pp. 1-28.
Petitioner C&D Zodiac, Inc.'s Notice of Appeal, filed Mar. 19, 2018 in IPR2017-01273, pp. 1-24.
Petitioner C&D Zodiac, Inc.'s Notice of Cross-Appeal to the United States Court of Appeals for the Federal Circuit, filed Dec. 22, 2015 in IPR2014-00727, pp. 1-5.
Petitioner C&D Zodiac, Inc.'s Notice of Transcript Filing and Exhibit List, filed Apr. 15, 2015 in IPR2014-00727, pp. 1-4.
Petitioner C&D Zodiac, Inc.'s Notice of Transcript Filing and Exhibit List, filed May 15, 2015 in IPR2014-00727, pp. 1-6.
Petitioner C&D Zodiac, Inc.'s Objections to Admissibility of Evidence Served with Patent Owner B/E Aerospace, Inc.'s Corrected Response Pursuant to 37 C.F.R. § 42.120, filed Feb. 17, 2015 in IPR2014-00727, pp. 1-17.
Petitioner C&D Zodiac, Inc.'s Objections to Admissibility of Evidence Served with Patent Owner B/E Aerospace, Inc.'s Preliminary Response, filed Nov. 12, 2014 in IPR2014-00727, pp. 1-9.
Petitioner C&D Zodiac, Inc.'s Objections to Patent Owner B/E Aerospace, Inc.'s Evidence, filed Feb. 28, 2018 in IPR 2017-01275, pp. 1-11.
Petitioner C&D Zodiac, Inc.'s Objections to Patent Owner B/E Aerospace, Inc.'s Evidence, filed Feb. 28, 2018 in IPR 2017-01276, pp. 1-11.
Petitioner C&D Zodiac, Inc.'s Objections to Patent Owner B/E Aerospace, Inc.'s Evidence, served Feb. 7, 2018 in IPR2017-01275, pp. 1-27.
Petitioner C&D Zodiac, Inc.'s Objections to Patent Owner B/E Aerospace, Inc.'s Evidence, served Feb. 7, 2018 in IPR2017-01276, pp. 1-28.
Petitioner C&D Zodiac, Inc.'s Opposition to Patent Owner B/E Aerospace, Inc.'s Motion to Exclude Evidence, filed Jul. 13, 2018 in IPR2017-01275, pp. 1-20.
Petitioner C&D Zodiac, Inc.'s Opposition to Patent Owner B/E Aerospace, Inc.'s Motion to Exclude Evidence, filed Jul. 13, 2018 in IPR2017-01276, pp. 1-20.
Petitioner C&D Zodiac, Inc.'s Reply In Support of Its Motion to Exclude Evidence Pursuant to 37C.F.R. § 42.64(c), filed Jun. 8, 2015 in IPR2014-00727, pp. 1-10.
Petitioner C&D Zodiac, Inc.'s Reply to Patent Owner B/E Aerospace, Inc.'s Response, filed May 1, 2015 in IPR2014-00727, pp. 1-24.
Petitioner C&D Zodiac, Inc.'s Reply, filed May 1, 2018 in IPR2017-01275, pp. 1-35.
Petitioner C&D Zodiac, Inc.'s Reply, filed May 1, 2018 in IPR2017-01276, pp. 1-35.
Petitioner C&D Zodiac, Inc.'s Request for Oral Argument, filed in Jun. 22, 2018 in IPR2017-01275, pp. 1-4.

(56) References Cited

OTHER PUBLICATIONS

Petitioner C&D Zodiac, Inc.'s Request for Oral Argument, filed Jun. 22, 2018 in IPR2017-01276, pp. 1-4.
Petitioner C&D Zodiac, Inc.'s Request for Partial Adverse Judgment, filed Jun. 28, 2018 in IPR2017-01275, pp. 1-5.
Petitioner C&D Zodiac, Inc.'s Request for Partial Adverse Judgment, filed Jun. 28, 2018 in IPR2017-01276, pp. 1-5.
Pictures of C&D Zodiac/Zodiac Aerospace—Huntington Beach Office, 1 page.
Pictures of C&D Zodiac/Zodiac Aerospace—La Palma Office, 1 page.
Plaintiff's Infringement Contentions in BE Aerospace, Inc. v. Safran Cabin Inc., et al., No. 2:19-cv-01480-MWF-AFM, served Sep. 1, 2021, filed Mar. 25, 2022 in IPR2022-00749, pp. 1-37.
Plaintiff's Reply Claim Construction Brief in BE Aerospace, Inc. v. Safran Cabin Inc., et al., No. 2:19-cv-01480-MWF-AFM, Dkt. 339, filed Mar. 25, 2022 in IPR2022-00749, pp. 1-19.
Preliminary Amendment, filed Jun. 6, 2016 in U.S. Appl. No. 15/141,338, pp. 1-7.
Prosecution history for U.S. Pat. No. 6,520,451, pp. 1-129.
Prosecution History for U.S. Pat. No. 8,590,838, pp. 1-303.
Prosecution History for U.S. Pat. No. 9,073,641, pp. 1-463.
Prosecution History of U.S. Pat. No. 10,625,862 B2, filed Mar. 25, 2022 in IPR2022-00749, pp. 1-224.
Prosecution History of U.S. Pat. No. 9,365,292, filed in IPR2017-01274 on Apr. 13, 2017, pp. 1-782.
Prosecution History of U.S. Pat. No. 9,440,742, filed Apr. 13, 2017 in IPR2017-01276, pp. 1-86.
Record of Oral Hearing in IPR2017-01275, IPR2017-01276 and PGR2017-00019, held Aug. 3, 2018, pp. 1-97.
Rendering of the KLM Crew Rest, 1 page.
Reply Declaration of Alan Anderson, signed May 1, 2015 in IPR2014-00727, pp. 1-31.
Reply to Office Action, filed Mar. 23, 2015 in U.S. Appl. No. 14/043,500, pp. 1-8.
Reply to Patent Owner's Preliminary Response filed Sep. 8, 2022 in IPR2022-00749, pp. 1-8.
Report and Recommendation Denying Preliminary Injunction in BE Aerospace, Inc. v. Zodiac Aerospace, et al. No. 2:16-CV-01417-JRG, filed Mar. 25, 2022 in IPR2022-00749, pp. 1-22.
Reporter's Transcript of Telephonic Proceedings held Apr. 1, 2015 in the matter of C&D Zodiac, Inc. v. B/E Aerospace, Inc. in IPR2014-00727, pp. 1-32.
Reporter's Transcript of Telephonic Proceedings held May 14, 2015 in the matter of C&D Zodiac, Inc. v. B/E Aerospace, Inc. in IPR2014-00727, pp. 1-28.
Request for Reconsideration of Decision Denying Institution of Inter Partes Review, filed in IPR2017-01274 on Nov. 29, 2017, pp. 1-15.
Request for Reconsideration of Decision Denying Institution of Inter Partes Review, filed Nov. 29, 2017 in IPR2017-01273, pp. 1-15.
Request for Rehearing Following Final Written Decision Pursuant to 37 C.F.R. § 42.71(d), filed Nov. 2, 2018 in IPR2017-01275, pp. 1-19.
Response and Amendment including Exhibits, filed Apr. 1, 2016 in U.S. Appl. No. 14/709,378, pp. 1-249.
Return of Service in the case of B/E Aerospace, Inc. v. Zodiac Aerospace, et al., No. 2:14-cv-210 (E.D. Tex.) indicating complaint was served on Petitioner on Mar. 13, 2014, pp. 1-13.
Rivals Battle to Design Toilets Good Enough to Fly dated Mar. 28, 2013, pp. 1-4—http://online.wsj.com/news/articles/SB10001424127887323293704578330294197225064#printMode.
Scheduling Order 37 C.F.R. § 42.5, in IPR2017-01275, IPR2017-01276 and PGR2017-00019, Paper No. 13, entered Oct. 31, 2017, pp. 1-8.
Scheduling Order issued Oct. 21, 2022 in IPR2022-00749, pp. 1-12.
StartupBoeing, "DC-10 Series Interior Arrangements," Aug. 31, 2007, pp. 1-6. http://www.boeing.com/assets/pdf/commercial/startup/pdf/historical/DC10_int.pdf.

StartupBoeing, "DC-10 Series Lower Hold Compartments," Aug. 31, 2007, pp. 1-7. http://www.boeing.com/assets/pdf/commercial/startup/pdf/historical/DC10_cargo.pdf.
The 7 best products for aircraft cabins in 2014 dated Apr. 8, 2014, pp. 1-3.
Third-Party Submission under 37 CFR 1.290 submitted in U.S. Appl. No. 14/709,378, filed Feb. 2, 2016 considered by Examiner Lee on May 5, 2016, pp. 1-6.
Third-Party Submission under 37 CFR 1.290 submitted in U.S. Appl. No. 14/709,378, filed Feb. 2, 2016, pp. 1-7.
Thomas Boozer curriculum vitae, pp. 1-4.
Transcript of Alan Anderson's Deposition of Dec. 18, 2014 in IPR2014-00727, pp. 1-132.
Transcript of Preliminary Injunction Hearing Before the Honorable Judge Roy S. Payne, B/E Aerospace, Inc. v. Zodiac Aerospace, et al., Case 2:16-cv-01417-JRG-RSP (E.D. Tex.) held Apr. 13, 2017, pp. 1-21.
Transcript of Telephonic Proceedings held Mar. 2, 2015 in the matter of C&D Zodiac, Inc. v. B/E Aerospace, Inc. in IPR2014-00727, pp. 1-17.
Transcript of Telephonic Proceedings held Nov. 21, 2014 in the matter of C&D Zodiac, Inc. v. B/E Aerospace, Inc. in IPR2014-00727, pp. 1-28.
Transcript of Telephonic Proceedings held Sep. 17, 2014 in the matter of C&D Zodiac, Inc. v. B/E Aerospace, Inc. in IPR2014-00727, pp. 1-26.
Transcript of Videotaped Deposition of Adam Lee Deshowitz, Ph.D., P.E. held Apr. 11, 2017, B/E Aerospace Inc. v. Zodiac Aerospace, et al., Case 2:16-cv-01417-JRG-RSP (E.D. Tex.) pp. 1-98.
Transcript of Videotaped Deposition of Alan Anderson held Jan. 12, 2018 (IPR2017-01275 and IPR2017-01276), pp. 1-111.
Transcript of Videotaped Deposition of Alan J. Anderson, Apr. 4, 2017, B/E/Aerospace Inc. v. Zodiac Aerospace, et al., Case 2:16-cv-01417-JRG-RSP (E.D. Tex.), pp. 1-76.
Transcript of Videotaped Deposition of James Brunke held Feb. 21, 2017, B/E Aerospace Inc. v. Zodiac Aerospace, et al., Case 2:16-cv-01417-JRG-RSP (E.D. Tex.), pp. 1-122.
Transcript of Videotaped Deposition of Ronald B. Kemnitzer held Jan. 23, 2018 (PGR2017-00019), pp. 1-36.
United States District Court for the Central District of California, Extension of the Temporary Suspension of Jury Trials, filed Mar. 25, 2022 in IPR2022-00749, 1 page.
United States Securities and Exchange Commission Form 10-Q for the quarterly period ended Aug. 29, 1998 for B/E Aerospace, Inc., dated Sep. 24, 1998, pp. 1-18.
Unopposed Motion to Withdraw Motion for Preliminary Injunction in B/E Aerospace, Inc. v. Zodiac Aerospace, et al., No. 2:14-cv-210, Dkt. 47 (E.D. Tex. Jun. 6, 2014) pp. 1-5.
U.S. Office Action in Ex Parte Reexamination for U.S. Appl. No. 90/014,978, dated Jan. 10, 2023, 16 pages.
U.S. Office Action in Ex Parte Reexamination for U.S. Appl. No. 90/014,978, dated Sep. 7, 2022, 11 pages.
U.S. Office Action in Ex Parte Reexamination for U.S. Appl. No. 90/014,979, dated Jan. 10, 2023, 18 pages.
U.S. Office Action in Ex Parte Reexamination for U.S. Appl. No. 90/014,979, dated Sep. 7, 2022, 12 pages.
U.S. Office Action in Ex Parte Reexamination for U.S. Appl. No. 90/014,980, dated Jan. 10, 2023, 22 pages.
U.S. Office Action in Ex Parte Reexamination for U.S. Appl. No. 90/014,980, dated Sep. 7, 2022, 17 pages.
Why B/E Aerospace is Flying High dated Apr. 2014, pp. 1-3.
Zodiac Aerospace Jobs on Linkedin, pp. 1-5—https://www.linkedin.com/jobs/search?keywords=Zodiac%20Aerospace&location=gainesville%2C%20texas&locationId-Gainesville%2C%20texas&location=&trk=jobs_jserp_search_button-exe.
Zodiac Aerospace Website, Our activities, Cabin, pp. 1-2.—http://www.zodiacaerospacee.com/en/our-activities/cabin.
Zodiac Aerospace Website, Our activities, Seats, pp. 1-2.—http://www.zodiacaerospace.com/en/our-activities/seats.
Zodiac Aerospace Website, Products & Services, 1 page. http://www.zodiacaerospace.com/en/products-services.
Zodiac Aerospace's .2rL.9 JJor's Blog, pp. 1-2.

(56) References Cited

OTHER PUBLICATIONS

Zodiac Aerospace's Apex Editor's Blog dated Jan. 19, 2012, pp. 1-6.
Zodiac Aerospace's Corporate Locations, 1 page.
Zodiac Aerospace's Corporate Presentation, pp. 1-2.
Zodiac Aerospace's Headquarter Information, dated Jul. 27, 2017, pp. 1-2.
Zodiac Aerospace's Presentation, "The World of Zodiac," pp. 1-6 https://prezi.com/embed/hzcqtyfpkowc.
Zodiac Aerospace's Website (starting page), 1 page.
Zodiac Aerospace, Annual Report 2014-2015, pp. 1-144.
Zodiac Aerospace, Annual Report 2015-2016, pp. 1-156.
Zodiac Aerospace, APEX Editor's Blog, "Japan's Yokohama 'extremely disappointed' as Boeing picks BE for 737 lavatories," Jan. 19, 2012, pp. 1-6. http://blog.apex.aero/cabin-interior/japans-yokohama-extremely-disappointed-as-boeing-picks-be-for-737-lavatories/.
Zodiac Aerospace, APEX Editor's Blog, "New aircraft lav sees B/E Aerospace flushed with success," Apr. 19, 2013, 1 page.
Zodiac Aerospace, APEX Editor's Blog, "Picture: Airbus markets new streamlined lavatory design for A320 narrowbodies," May 21, 2013, 1 page.
Zodiac Aerospace, Business Report 2015-2016, pp. 1-47.
Zodiac Aerospace, Career Website, 1 page—http://zodiacaerospace.profils.org/accueil.aspx?LCID=1033.
Zodiac Aerospace, Job Details, pp. 1-12—http://zodiacaerospace.profils.org/job/print-job-form-nr011717-manufacturing-engineer-6215.aspx.
Zodiac Aerospace, News, New Premium Economy Seat, pp. 1-3—http://www.zodiacaerospace.com/en/news/subsidiaries-news/new-premium-economy-seat.
Zodiac Aerospace, Press Release—Apr. 20, 2016, "Zodiac Aerospace confirms its FY2015/2016 target," pp. 1-10.
Zodiac Aerospace, Reference: ZA-Q-1030, Rev. C, ZA Standard, Requirements Applicable to Suppliers, Jul. 26, 2013, pp. 1-21.
Zodiac Aerospace, Travel Journal, Annual Report 2014-2015, pp. 1-92.
Zodiac Aerospace, Zodiac Airline Interior Integration, pp. 1-2—http://www.zodiacaerospacecom/en/zodiac-airline-interior-integration.
Zodiac Aerospace, Zodiac Custom Cabin & Integration, 1 page.—http://www.zodiacaerospacecom/en/our-activities/cabin/zodiac-customcabin-integration.
Zodiac Aerospace's .2rL.9 JJor's Blog, filed Jan. 31, 2018 in IPR2017-01276, pp. 1-2.
Zodiac Aerospace's Apex Editor's Blog dated Apr. 19, 2013, pp. 1-2.
Zodiac product drawing, (Exhibit to Alan Anderson Deposition Dec. 18, 2014), 1 page.

AIRCRAFT INTERIOR LAVATORY

CROSS-REFERENCE TO RELATED PATENT APPLICATIONS

This application is a Continuation of application Ser. No. 16/819,878, filed Mar. 16, 2020, which is a Continuation of application Ser. No. 16/283,471, filed Feb. 22, 2019, now U.S. Pat. No. 10,625,862, which is a Continuation of application Ser. No. 15/258,529, filed Sep. 7, 2016, now U.S. Pat. No. 10,259,558, which is a Continuation of application Ser. No. 15/141,494, filed Apr. 28, 2016, now U.S. Pat. No. 9,463,878, which is a Continuation of application Ser. No. 14/709,378, filed May 11, 2015, now U.S. Pat. No. 9,365,292, which is a Continuation of application Ser. No. 14/043,500, filed Oct. 1, 2013, now U.S. Pat. No. 9,073,641, which is a Continuation of application Ser. No. 13/089,063, filed Apr. 18, 2011, now U.S. Pat. No. 8,590,838, which claims the benefit of Provisional Application No. 61/326,198, filed Apr. 20, 2010, and Provisional Application No. 61/346,835, filed May 20, 2010, all of which are incorporated by reference herein in their entireties.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
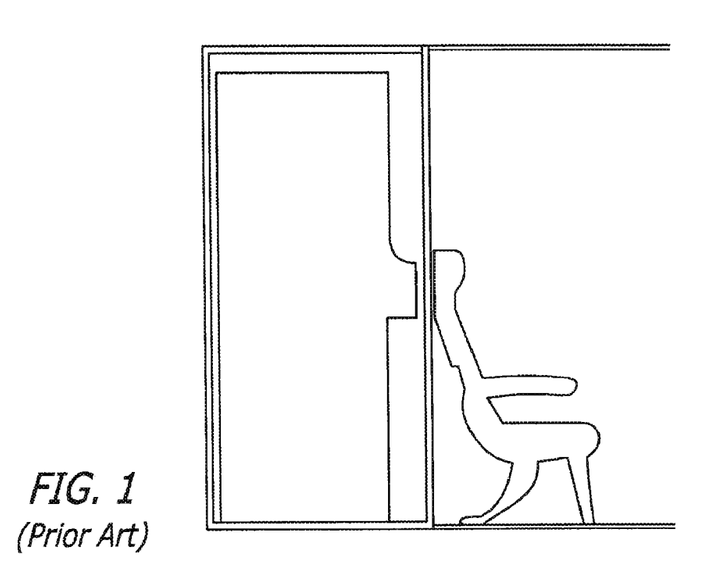
FIG. 1 is a schematic diagram of a prior art installation of a lavatory immediately aft of and adjacent to an aircraft passenger seat.
Figure 2:
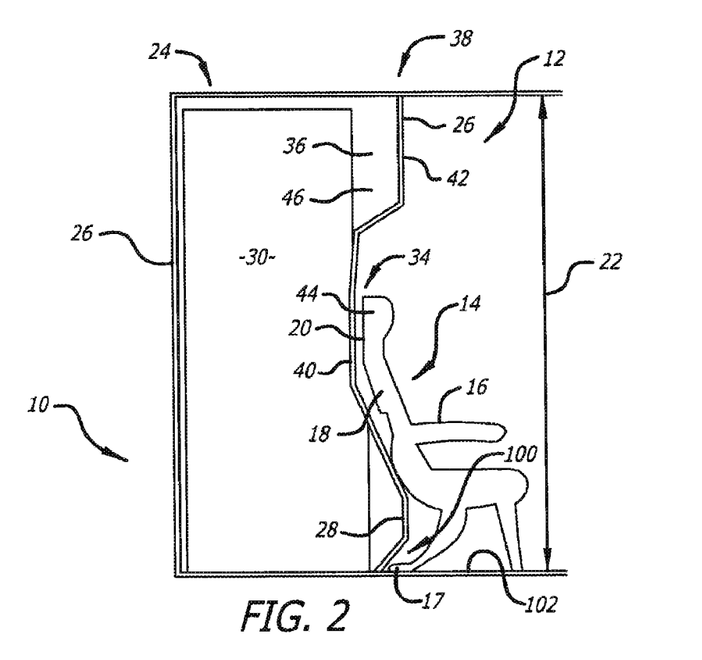
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An enclosure for a cabin of an aircraft, comprising:
an aft wall; and
a forward wall comprising:
an upper portion;
a lower portion; and
a middle portion below the upper portion;
wherein the lower portion of the forward wall is adapted to receive at least a portion of a seat support of a seat aftward of at least a portion of the lower portion for mounting the seat support to the aircraft; and
wherein the forward wall is adapted to receive loads from a structure within the cabin.

2. The enclosure of claim 1, wherein the forward wall is adapted to be positioned adjacent the structure without a gap.

3. The enclosure of claim 1, wherein the forward wall is adapted to receive loads from the seat.

4. The enclosure of claim 1, wherein the forward wall is adapted to receive loads from an adjacent structure exterior of the enclosure.

5. The enclosure of claim 1, wherein a forward surface of the forward wall is shaped to substantially conform to a shape of the upwardly and aftwardly inclined seat back of the seat.

6. The enclosure of claim 5, wherein an aft-facing surface of the lower portion is accessible from the interior.

7. The enclosure of claim 5, wherein an aft-facing surface of the middle portion is accessible from the interior.

8. The enclosure of claim 5, wherein at least an aft-facing surface of the upper portion, an aft-facing surface of the middle portion, and an aft-facing surface of the lower portion of the forward wall are accessible from an interior of the enclosure.

9. The enclosure of claim 1, wherein the middle portion defines an upper recess aftward of at least a portion of the lower portion.

10. The enclosure of claim 9, wherein the upper recess is adapted to receive at least a portion of an exterior aft surface of a seat back of the seat when the seat back is in an upright and not a reclined position.

11. The enclosure of claim 1, wherein an aft-facing surface of the upper portion defines an interior secondary space aftward of the aft-facing surface of the upper portion.

12. The enclosure of claim 1, wherein the enclosure comprises a lavatory;
wherein the forward wall extends from a floor to a ceiling of the cabin; and
wherein the structure is mounted within the cabin independent from the lavatory and the forward wall.

13. An enclosure for a cabin of an aircraft, comprising:
an aft wall; and
a forward wall comprising:
an upper portion;
a lower portion; and
a middle portion below the upper portion;
wherein the lower portion of the forward wall is adapted to receive at least a portion of a seat support of a seat aftward of at least a portion of the lower portion for mounting the seat support to the aircraft; and
wherein the forward wall is configured to be positioned adjacent a structure within the cabin without a gap and accept loads from the structure.

14. The enclosure of claim 13, wherein the structure comprises the seat.

15. The enclosure of claim 13, wherein the structure is exterior of the enclosure.

16. The enclosure of claim 13, wherein the middle portion defines an upper recess aftward of at least a portion of the lower portion.

17. An enclosure for a cabin of an aircraft, the cabin having an aircraft passenger seat positioned forward of and adjacent to the enclosure, the enclosure comprising:
an aft wall; and
a forward wall, wherein an interior of the enclosure is disposed between the aft wall and the forward wall, the forward wall comprising:
an upper portion;
a middle portion below the upper portion, the middle portion including a flat portion; and
a lower portion below the middle portion;
wherein the lower portion comprises a downward extending vertical portion, and wherein a seat support of the aircraft passenger seat is secured aft of the downward extending vertical portion, the seat support configured to interface with a floor of the cabin and hold a seat bottom of the aircraft passenger seat in an elevated position.

18. The enclosure of claim 17, wherein the middle portion defines an upper recess.

19. The enclosure of claim 18, wherein the flat portion of the middle portion defines an aft-most portion of the upper recess and the portion of an exterior aft surface of the seat back is an upper seat back such that the aft-most portion of the upper recess is parallel to an aft surface of the upper seat back when the seat back is in an unreclined position.

20. The enclosure of claim 17, wherein the forward wall is configured to accept loads from a structure adjacent the enclosure.

21. The enclosure of claim 20, wherein the enclosure is configured to be positioned adjacent a portion of the structure with no gap.

22. The enclosure of claim 20, wherein the structure comprises the aircraft passenger seat.

23. The enclosure of claim 12 wherein the forward wall is adapted to be positioned adjacent the structure without a gap.

24. The enclosure of claim 13, wherein the enclosure comprises a lavatory;
wherein the forward wall extends from a floor to a ceiling of the cabin; and
wherein the structure is mounted within the cabin independent from the lavatory and the forward wall.

25. The enclosure of claim 17, wherein the enclosure comprises a lavatory;
wherein the forward wall extends from a floor to a ceiling of the cabin; and
wherein the structure is mounted within the cabin independent from the lavatory and the forward wall.

26. The enclosure of claim 25 wherein the forward wall is adapted to be positioned adjacent the structure without a gap.

\* \* \* \* \*